(12) United States Patent
Ramakrishnan et al.

(10) Patent No.: US 7,586,622 B1
(45) Date of Patent: Sep. 8, 2009

(54) MEASURING THICKNESS OF A DEVICE LAYER USING REFLECTANCE AND TRANSMISSION PROFILES OF BASELINE DEVICES

(75) Inventors: Ed Sundaram Ramakrishnan, San Jose, CA (US); Alberto Goenaga, Goleta, CA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 227 days.

(21) Appl. No.: 11/303,905

(22) Filed: Dec. 16, 2005

Related U.S. Application Data

(60) Provisional application No. 60/640,593, filed on Dec. 30, 2004.

(51) Int. Cl.
*G01B 11/06* (2006.01)
(52) U.S. Cl. .................................................. 356/504
(58) Field of Classification Search ................. 356/503, 356/504, 630, 632
See application file for complete search history.

(56) References Cited

U.S. PATENT DOCUMENTS

| | | | | |
|---|---|---|---|---|
| 3,601,492 A | * | 8/1971 | Reichard | 356/504 |
| 3,824,017 A | * | 7/1974 | Galyon | 356/504 |
| 5,101,111 A | * | 3/1992 | Kondo | 356/632 |
| 5,523,840 A | * | 6/1996 | Nishizawa et al. | 356/504 |
| 6,091,485 A | * | 7/2000 | Li et al. | 356/630 |
| 6,392,756 B1 | | 5/2002 | Li et al. | 356/632 |
| 2002/0030826 A1 | * | 3/2002 | Chalmers et al. | 356/630 |

OTHER PUBLICATIONS

Forrest, S.R., "The Path to Ubiquitous and Low-Cost Organic Electronic Appliances on Plastic", *Nature*, Apr. 2004, 428, 911-918.
Szczyrbowski, J., et al., "Optical Properties of Rough Thin Films", *Thin Solid Films*, 1985, 130(1-2), 57-73.

\* cited by examiner

*Primary Examiner*—Samuel A Turner
(74) *Attorney, Agent, or Firm*—Woodcock Washburn LLP

(57) ABSTRACT

A method for measuring a layer of a device is provided. In an embodiment, a set of baseline reflectance profiles may be generated from a corresponding set of baseline devices. Each of the baseline devices may include a layer with a known thickness. A reflectance profile may also be generated from the device, which may include a layer with an unknown thickness. The reflectance profile generated from the device may then be compared to the set of reflectance profiles generated from the set of the baseline devices to determine the thickness of the layer of the device.

19 Claims, 3 Drawing Sheets

MEASURING THICKNESS OF A DEVICE LAYER USING REFLECTANCE AND TRANSMISSION PROFILES OF BASELINE DEVICES

CROSS REFERENCE

This application claims benefit to U.S. Provisional Application Ser. No. 60/640,593, filed Dec. 30, 2004, the disclosure of which is incorporated herein by reference in its entirety.

FIELD

This disclosure relates generally to layer measurements, for example, measurement of layers found in organic electronic devices, and materials and methods for performing the same.

BACKGROUND

Organic electronic devices convert electrical energy into radiation, detect signals through electronic processes, convert radiation into electrical energy, or include one or more organic semiconductor layers. Most organic electronic devices have a very thin layer as an electron injection layer. Generally, a thin layer such as the aforementioned electron injection layer is deposited over a light emitting organic layer using vacuum evaporation, sputtering, or another similar deposition method. Notably, the nominal thickness of such an electron injection layer typically is critical to the overall performance and usability of such organic electronic device, and therefore must be monitored and carefully controlled.

However, no method or process for determining the relative thickness of the electron injection layer in a non-destructive manner is believed to exist. For example, the electron injection layer must be immediately encapsulated as a protective measure so that the film does not degrade when exposed to air, moisture and the like. In addition, the extraordinarily small thickness of the electron injection layer prevents non-destructive measurement by way of standard physical tools such as step height profilers and the like.

Thus, what is needed are methods that address the above shortcomings and drawbacks.

SUMMARY

In one embodiment, a method for measuring a layer of a device is provided. The method includes generating a set of baseline reflectance profiles from a corresponding set of baseline devices, each baseline device having a known thickness of a layer thereof, generating a reflectance profile from the device and comparing the generated reflectance profile from the device to the generated set of baseline reflectance profiles from the corresponding set of baseline devices to determine the thickness of the layer of the device.

The foregoing general description and the following detailed description are exemplary and explanatory only and are not restrictive of the invention, as defined in the appended claims.

BRIEF DESCRIPTION OF THE DRAWINGS

Embodiments are illustrated in the accompanying figures to improve understanding of concepts as presented herein.

Figure 1:
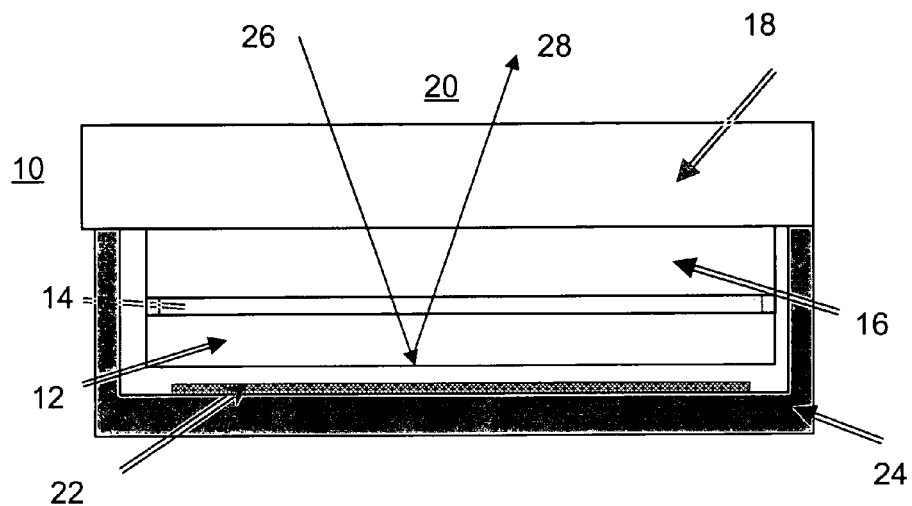
FIG. 1 is a block diagram illustrating a cross-section of a generalized organic electronic device having an electron injection layer.

The figures are provided by way of example and are not intended to limit the invention. Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

In one embodiment, a method for measuring a layer of a device is provided. The method includes generating a set of baseline reflectance profiles from a corresponding set of baseline devices, each baseline device having a known thickness of a layer thereof, generating a reflectance profile from the device and comparing the generated reflectance profile from the device to the generated set of baseline reflectance profiles from the corresponding set of baseline devices to determine the thickness of the layer of the device.

In one embodiment, generating the reflectance profile comprises generating a reflectance profile comparing reflectance at a viewing side of the device or baseline device against a defined spectrum range.

In one embodiment, the method further includes generating the reflectance profile at a spectrum range of 190-1000 nm.

In one embodiment, the method further includes generating the set of baseline reflectance profiles from the corresponding set of baseline devices such that the reflectance profiles vary based on the thicknesses of the layers of the baseline devices, whereby reflectance decreases as the thickness of the layer increases.

In one embodiment, comparing the reflectance profiles comprises matching the reflectance profile of the device to the reflectance profiles of the baseline devices to find close matching reflectance profiles of the baseline devices, and using the corresponding thicknesses of such close matching reflectance profiles to determine the thickness for the device.

In one embodiment, comparing the reflectance profiles comprises employing data analysis software.

In one embodiment, the method further includes employing the data analysis software to measure the thickness of the layer of a plurality of the devices in a non-destructive manner and in a near real-time manner in a mass-production setting.

In one embodiment, generating the set of baseline reflectance profiles from the corresponding set of baseline devices comprises selecting a plurality of baseline devices, and, for each selected baseline device: generating a reflectance profile for the baseline device, and determining a thickness of the layer of the baseline device; and compiling the generated reflectance profiles and corresponding determined thicknesses into a predetermined format.

In one embodiment, determining the thickness of the layer of each baseline device comprises transversely slicing the baseline device through the layers thereof and measuring such thickness.

In one embodiment, a method for measuring a thickness of a device layer is provided. The method includes generating a set of baseline transmission profiles from a corresponding set of baseline devices, each baseline device having a known thickness of the layer thereof, generating a transmission profile from the device and comparing the generated transmission profile from the device to the generated set of baseline transmission profiles from the corresponding set of baseline devices to determine the thickness of the layer of the device.

In one embodiment, generating each transmission profile comprises generating a transmission profile comparing transmission from a viewing side to an opposite side of the device against a defined spectrum range.

In one embodiment, the method further includes generating the transmission profile at a spectrum range of 190-1000 nm.

In one embodiment, the method further includes generating a set of baseline transmission profiles from a corresponding set of baseline devices such that the transmission profiles vary primarily based on the thicknesses of the layers of the baseline devices, whereby transmission decreases as the thickness of the layer increases.

In one embodiment, comparing the transmission profiles comprises matching the transmission profile of the device to the transmission profiles of the baseline devices to find matching transmission profiles of the baseline devices, and using the corresponding thicknesses of such close matching transmission profiles to determine the thickness for the device.

In one embodiment, comparing the transmission profiles comprises employing data analysis software.

In one embodiment, the method further includes employing the data analysis software to measure the thickness of the layer of a plurality of the devices in a non-destructive manner and in a near real-time manner in a mass-production setting.

In one embodiment, determining the thickness of the layer of each baseline device comprises transversely slicing the baseline device through the layers thereof and measuring such thickness.

In one embodiment, a composition including the layer measured by the method described above is provided.

In one embodiment, an organic electronic device having an active layer including the layer measured by the method described above is provided.

In one embodiment, an article useful in the manufacture of an organic electronic device, comprising the layer measured by the method described above is provided.

In one embodiment, compositions are provided comprising the above-described compounds and at least one solvent, processing aid, charge transporting material, or charge blocking material. These compositions can be in any form, including, but not limited to solvents, emulsions, and colloidal dispersions.

DEFINITIONS

The use of "a" or "an" are employed to describe elements and components of the invention. This is done merely for convenience and to give a general sense of the invention. This description should be read to include one or at least one and the singular also includes the plural unless it is obvious that it is meant otherwise.

The term "active" when referring to a layer or material is intended to mean a layer or material that exhibits electronic or electro-radiative properties. An active layer material may emit radiation or exhibit a change in concentration of electron-hole pairs when receiving radiation. Thus, the term "active material" refers to a material which electronically facilitates the operation of the device. Examples of active materials include, but are not limited to, materials which conduct, inject, transport, or block a charge, where the charge can be either an electron or a hole. Examples of inactive materials include, but are not limited to, planarization materials, insulating materials, and environmental barrier materials.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "layer" is used interchangeably with the term "film" and refers to a coating covering a desired area. The area can be as large as an entire device or a specific functional area such as the actual visual display, or as small as a single sub-pixel. Films can be formed by any conventional deposition technique, including vapor deposition and liquid deposition. Liquid deposition techniques include, but are not limited to, continuous deposition techniques such as spin coating, gravure coating, curtain coating, dip coating, slot-die coating, spray-coating, and continuous nozzle coating; and discontinuous deposition techniques such as ink jet printing, gravure printing, and screen printing.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode), or any combination of devices in items (1) through (4). The term device also includes coating materials for memory storage devices, antistatic films, biosensors, electrochromic devices, solid electrolyte capacitors, energy storage devices such as a rechargeable battery, and electromagnetic shielding applications.

The term "substrate" is intended to mean a workpiece that can be either rigid or flexible and may include one or more layers of one or more materials, which can include, but are not limited to, glass, polymer, metal, or ceramic materials, or combinations thereof. As used herein, the term "adjacent," does not necessarily mean that a layer, member or structure is immediately next to another layer, member or structure. A combination of layer(s), member(s) or structure(s) that directly contact each other are still adjacent to each other.

The term "buffer layer" or "buffer material" is intended to are electrically conductive or semiconductive materials and may have one or more functions in an organic electronic device, including but not limited to, planarization of the underlying layer, charge transport and/or charge injection properties, scavenging of impurities such as oxygen or metal ions, and other aspects to facilitate or to improve the performance of the organic electronic device. Buffer Materials may be polymers, solutions, dispersions, suspensions, emulsions, colloidal mixtures, or other compositions.

The term "electrode" is intended to mean a member or structure configured to transport carriers within an electronic component. For example, an electrode may be an anode, a cathode, a capacitor electrode, a gate electrode, etc. An electrode may include a part of a transistor, a capacitor, a resistor, an inductor, a diode, an electronic component, a power supply, or any combination thereof.

The term "electronic device" is intended to mean a collection of circuits, electronic components, or combinations thereof that collectively, when properly connected and supplied with the appropriate potential(s), performs a function. An electronic device may include or be part of a system. An examples of an electronic device include a display, a sensor array, a computer system, avionics, an automobile, a cellular phone, another consumer or industrial electronic product, or the like.

"Electron Transport" means when referring to a layer, material, member or structure, such a layer, material, member or structure that promotes or facilitates migration of negative charges through such a layer, material, member or structure into another layer, material, member or structure.

Electron transport materials (ET): Examples of electron transport materials include, but are not limited to, metal chelated oxinoid compounds, such as bis(2-methyl-8-quinolinolato)(para-phenyl-phenolato)aluminum(III) (BAlQ) and tris(8 hydroxyquinolato)aluminum (Alq3); azole compounds such as 2 (4-biphenylyl)-5-(4-t-butylphenyl)-1,3,4-oxadiazole (PBD), 3 (4-biphenylyl)-4-phenyl-5-(4-t-butylphenyl)-1,2,4-triazole (TAZ), and 1,3,5-tri(phenyl-2-benzimidazole) benzene (TPBI); quinoxaline derivatives such as 2,3-bis(4-fluorophenyl)quinoxaline; phenanthroline derivatives such as 9,10-diphenylphenanthroline (DPA) and 2,9-dimethyl-4,7-diphenyl-1,10-phenanthroline (DDPA); and mixtures thereof.

"Hole transport" when referring to a layer, material, member, or structure, is intended to mean such layer, material, member, or structure facilitates migration of positive charges through the thickness of such layer, material, member, or structure with relative efficiency and small loss of charge.

Hole transport materials (HT): Examples of hole transport materials for layer 120 have been summarized for example, in Kirk Othmer Encyclopedia of Chemical Technology, Fourth Edition, Vol. 18, p. 837 860, 1996, by Y. Wang. Both hole transporting molecules and polymers can be used. Commonly used hole transporting molecules include, but are not limited to: N,N' diphenyl-N,N'-bis(3-methylphenyl)-[1,1'-biphenyl]-4,4'-diamine (TPD), 1,1 bis[(di-4-tolylamino) phenyl]cyclohexane (TAPC), N,N' bis(4-methylphenyl)-N,N'-bis(4-ethylphenyl)-[1,1'-(3,3'-dimethyl)biphenyl]-4,4'-diamine (ETPD), tetrakis (3-methylphenyl)-N,N,N',N'-2,5-phenylenediamine (PDA), a-phenyl 4-N,N-diphenylaminostyrene (TPS), p (diethylamino)benzaldehyde diphenylhydrazone (DEH), triphenylamine (TPA), bis[4 (N,N-diethylamino)-2-methylphenyl](4-methylphenyl) methane (MPMP), 1 phenyl-3-[p-(diethylamino)styryl]-5-[p-(diethylamino)phenyl]pyrazoline (PPR or DEASP), 1,2 trans-bis(9H-carbazol-9-yl)cyclobutane (DCZB), N,N,N',N' tetrakis(4-methylphenyl)-(1,1'-biphenyl)-4,4'-diamine (TTB), N,N'-Bis(naphthalen-1-yl)-N,N'-bis-(phenyl)benzidine (α-NPB), and porphyrinic compounds, such as copper phthalocyanine. Commonly used hole transporting polymers include, but are not limited to, polyvinylcarbazole, (phenylmethyl)polysilane, poly(dioxythiophenes), and polyaniline.

It is also possible to obtain hole transporting polymers by doping hole transporting molecules such as those mentioned above into polymers such as polystyrene and polycarbonate.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic, and semiconductive member arts.

EXAMPLES

The concepts described herein will be further described in the following examples, which do not limit the scope of the claims.

Referring now to FIG. 1, a first generalized representation of an organic electronic device 10 is shown. As seen, the organic electronic device 10 includes the aforementioned reflective aluminum cathode layer 12 on top of which is (in order) the electron injection layer (electron injection layer) 14, a transparent anode layer 16 formed from a material such as ITO (indium tin oxide) or IZO (indium zinc oxide), and a transparent viewing layer 18 formed from a material such as glass or a plastic. Thus, the viewing side 20 of the organic electronic device 10 is on the exterior side of such viewing layer 18. In addition, the organic electronic device 10 may include a desiccant layer 22 for drawing moisture away from the electron injection layer 14 and other sensitive materials, and an encapsulation lid 24 for sealing the aluminum layer 12, the electron injection layer 14, the anode layer 16 and the desiccant layer 22 against the viewing layer 18.

Figure 2:
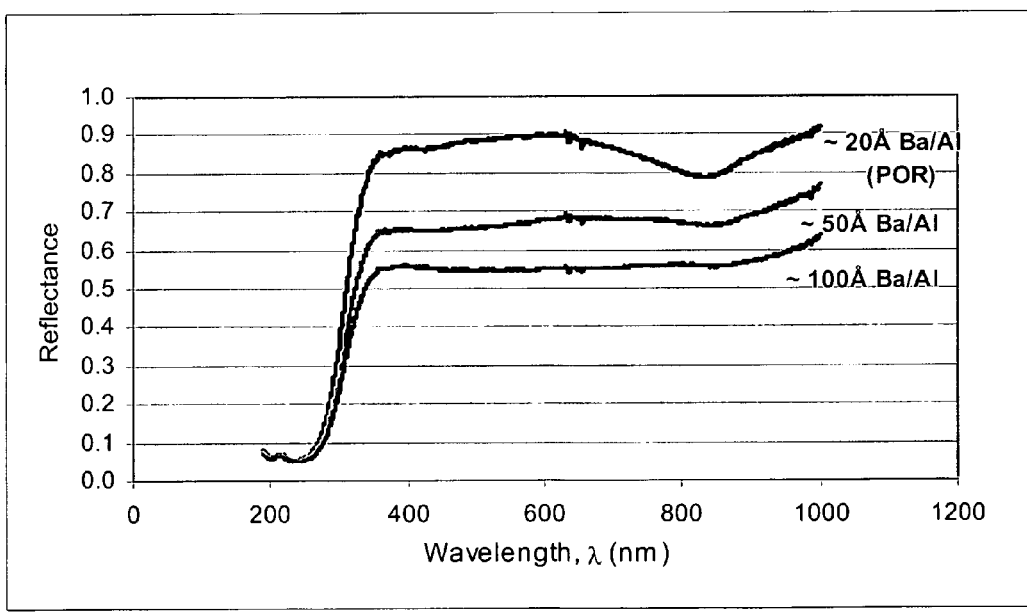
FIG. 2 is a chart illustrating reflectance profiles of organic electronic devices of the type illustrated in FIG. 1.

As shown in FIG. 1, in an embodiment, an incident light beam 26 is aimed at the viewing side 20 of the organic electronic device 10 at a near-normal fixed angle (about 8 degrees or so), and the reflected light is measured by an appropriate receiver 28 for intensity change to produce a reflectance profile such as that shown in FIG. 2. Producing such a reflectance profile is generally known or should be apparent to the relevant public and therefore need not be set forth herein in any detail. Accordingly, any appropriate method of generating such a reflectance profile may be employed without departing from the spirit and scope of an embodiment.

In one embodiment, such reflectance profile extends from ultra-violet through the visible spectrum range (about 190-1000 nm), although other ranges may also be employed without departing from the spirit and scope of an embodiment. As was set forth above, the reflectance profile of the reflected light varies primarily based on the thickness of the electron injection layer 14 of the organic electronic device 10 between the transparent layer 18 and the reflective layer 12. In particular, and as shown FIG. 2, reflectance decreases as the thickness of the electron injection layer 14 increases, especially in the range above about 350 nm. Such change in the reflectance profile is caused primarily by the increasing absorbance of the electron injection layer 14 with increasing thickness.

Figure 3:
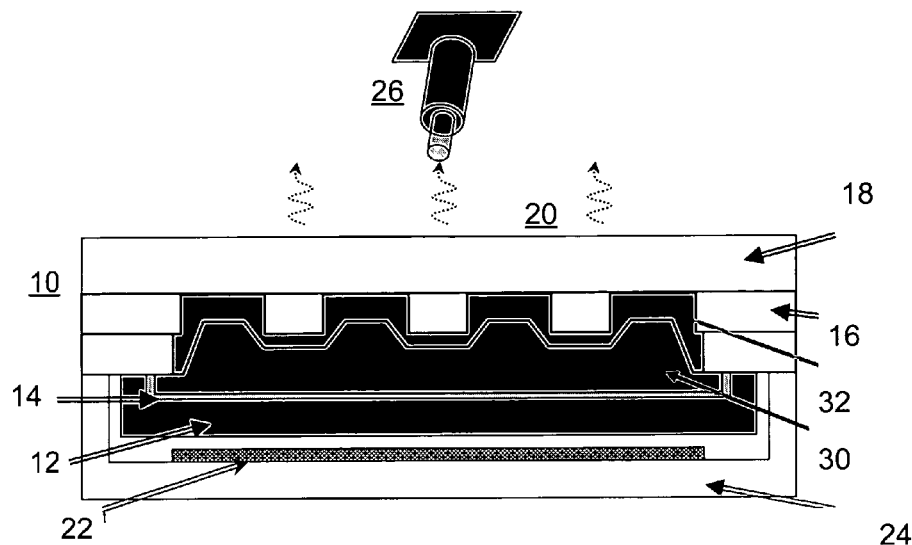
FIG. 3 is a block diagram illustrating a cross-section of a fabricated organic electronic device including an electron injection layer.

Referring now to FIG. 3, a second, more typical fabricated organic electronic device 10 is shown. Again, the organic electronic device 10 includes the aluminum cathode layer 12, the electron injection layer 14, the transparent anode layer 16, the transparent viewing layer 18 at the viewing side 20 of the organic electronic device, the desiccant layer 22, and the encapsulation lid 24. Here, though, a light emitting polymer layer 30 is provided adjacent the electron injection layer 14 to generate light of a particular color, and a buffer/hole transport layer 32 is positioned adjacent the polymer layer 30 on a side thereof opposite the electron injection layer 14 and interposed with the transparent anode layer 16.

Figure 4:
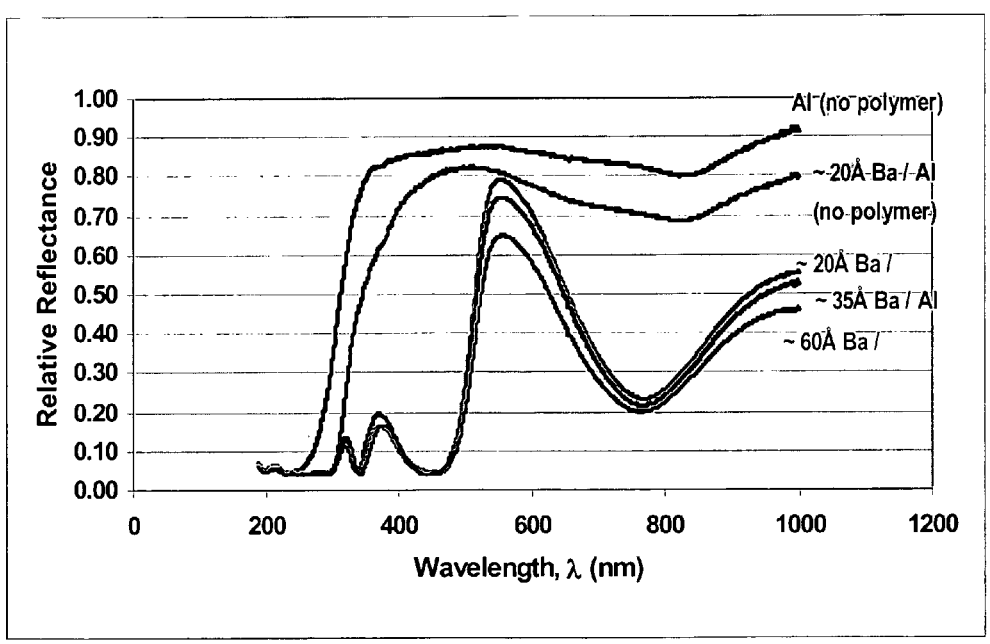
FIG. 4 is a chart illustrating reflectance profiles of organic electronic devices of the type illustrated in FIG. 3.

Again, and as shown in FIG. 3 the incident light beam 26 is aimed at the viewing side 20 of the organic electronic device 10, and the reflected light is measured for intensity change to produce a reflectance profile such as that shown in FIG. 4. Again, such reflectance profile extends from ultra-violet through the visible spectrum range (about 190-1000 nm), although other ranges may also be employed without departing from the spirit and scope of an embodiment. Once more, the reflectance profile of the reflected light varies primarily based on the thickness of the electron injection layer 14 of the organic electronic device 10, although here such electron injection layer 14 is generally between the reflective layer 12 and the transparent layer 18, the transport layer 32, and the polymer layer 30.

As shown in FIG. 4, though, the character of each reflectance profile is more complex in that such reflectance profile includes multiple maxima and minima, based primarily on the presence of the polymer layer 30. Nevertheless, reflectance still decreases as the thickness of the electron injection layer 14 increases, here in the range above about 300 nm. Again, such change in the reflectance profile is caused primarily by the increasing absorbance of the electron injection layer 14 with increasing thickness.

In an embodiment, then, the thickness of the electron injection layer 14 in a sample organic electronic device 10 is tested by generating a reflectance profile for the organic electronic device 10 in a non-destructive manner such as in the manner show in FIGS. 1-4. However, and significantly, the generated reflectance profile from the sample organic electronic device 10 is of little use unless such profile can be compared against reflectance profiles from organic electronic devices 10 of the same variety, where the thickness of the electron injection layers 14 of such organic electronic devices 10 is known.

Figure 5:
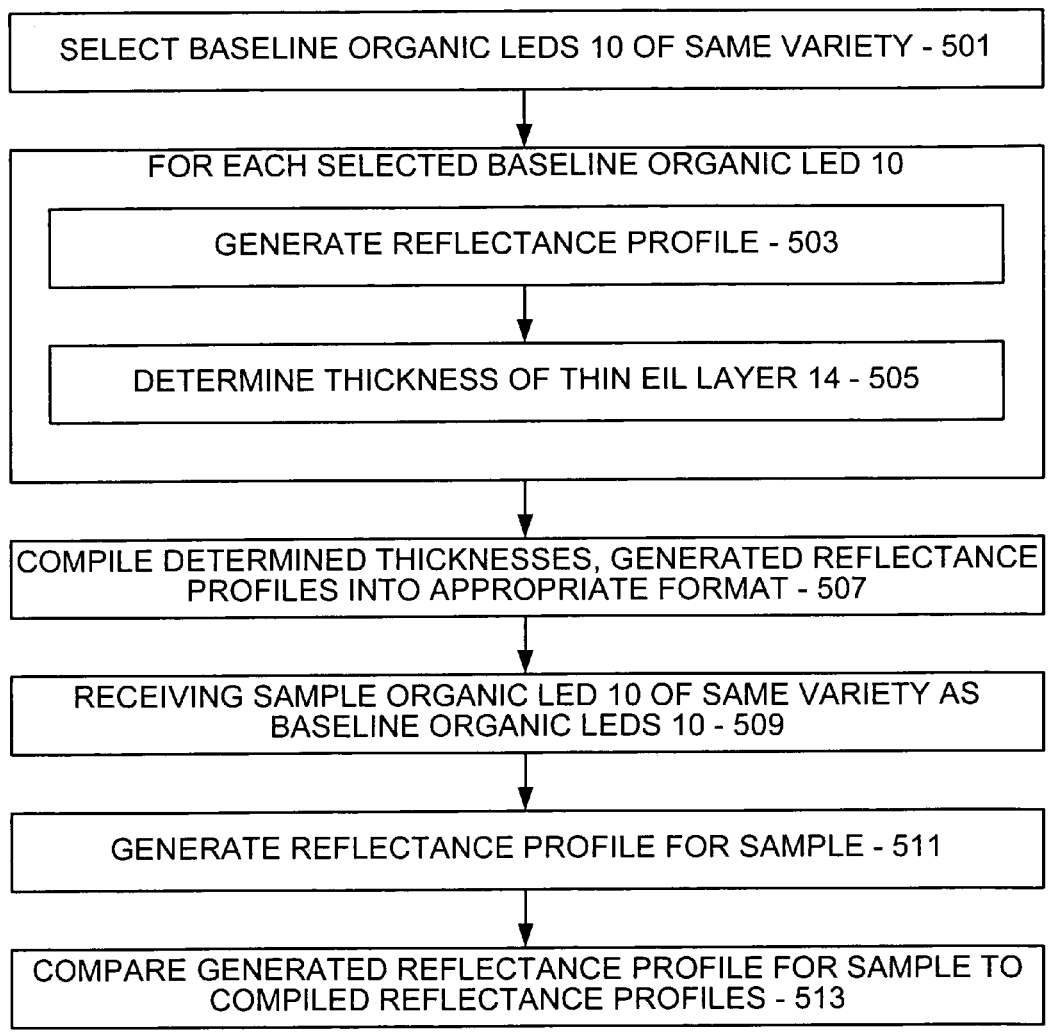
FIG. 5 is a flow diagram illustrating key steps performed based on reflectance profiles in accordance with one embodiment.

Accordingly, and in one embodiment, prior to generating reflectance profiles from sample organic electronic devices 10, a set of baseline reflectance profiles from baseline organic electronic devices 10 are generated. In particular, and referring now to FIG. 5, a plurality of baseline organic electronic devices 10 of the same variety are selected (step 501), and for each selected baseline organic electronic device 10, a reflectance profile is generated (step 503). Thereafter, for each selected and profiled baseline organic electronic device 10, the thickness of the electron injection layer layer 14 thereof is determined (step 505).

Determining such thickness may be performed in any appropriate manner without departing from the spirit and scope of an embodiment, although it is to be appreciated that such determination likely cannot be performed without destroying the baseline organic electronic device 10. For example, it may be that determining such thickness is achieved by transversely slicing the baseline organic electronic device 10 through the layers thereof and then viewing same under a microscope or electron microscope (not shown). As may be appreciated, upon such viewing, a visual measurement of the thickness of the electron injection layer 14 may be achieved. Note that although such transverse slicing destroys the baseline organic electronic devices 10, such destructiveness is acceptable inasmuch as same allows the thickness of the electron injection layer 14 of a sample organic electronic device 10 to be determined in a non-destructive manner, as will be set forth below.

At any rate, the determined thicknesses of the electron injection layer layers 14 of the baseline organic electronic devices are compiled into an appropriate format along with the corresponding reflectance profiles (step 507), such as for example a graphical form as shown in FIGS. 2 and 4, or such as for example a database of values. Accordingly, upon receiving a sample organic electronic devices 10 of the same variety as the baseline organic electronic devices 10 (step 509), a reflectance profile is generated therefrom (step 511), and the generated reflectance profile is compared to the compiled reflectance profiles from the baseline organic electronic devices 10 to determine the thickness of the electron injection layer 14 of such sample organic electronic device 10 in a non-destructive manner (step 513).

In particular, and as should be appreciated, the reflectance profile of the sample organic electronic device 10 is matched to the reflectance profiles of the baseline organic electronic devices 10 to find close matching reflectance profiles of the baseline organic electronic devices 10, and the corresponding thicknesses of such close matching reflectance profiles are examined and employed to determine the thickness for the sample organic electronic device 10, perhaps by way of estimation, interpolation, or more involved analysis. Analyzing such a reflectance profile from a sample organic electronic device 10 to determine thickness of the electron injection layer 14 thereof in view of close reflectance profiles with known thicknesses should be known or apparent to the relevant public and therefore need not be set forth herein in any detail. Accordingly, any appropriate method and mechanism for performing such analysis may be employed without departing from the spirit and scope of an embodiment.

For example, in one embodiment, appropriate data analysis software may be employed to compare data from a reflectance profile from a sample organic electronic device 10 against data from reflectance profiles from baseline organic electronic devices 10 to determine thickness. In fact, with such data analysis software, such thickness determination may be performed in a near real-time manner on each fully-fabricated organic electronic device 10 as constructed in a mass-production setting, without destroying such fabricated LED 10.

Note that although an embodiment is set forth in terms of a reflectance profile from a device such as an organic electronic device 10, other types of sensed profiles may also be employed without departing from the spirit and scope of an embodiment. For one example, if the device is primarily transparent, a transmission profile may also be employed instead of or in combination with the reflectance profile. For another example, the sensed profile may be based on measured angles of incidence, reflection, refraction, and the like.

In another embodiment, it is to be appreciated that measured reflectance or the like in at least some circumstances may be directly employed to calculate a thickness of an electron injection layer 14 of an organic electronic device. In particular, in the case where the layer 14 is separated from air by a substrate, the thickness of such layer 14 may be calculated based on the techniques set forth in J. Szczyrbowski, K. Schmalzbauer and H. Hoffmann, Thin Solid Films Vol: 130, pp. 57-73 (1985), hereby incorporated by reference in its entirety.

Briefly, and according to such reference, it may be presumed that:

$$R=|r|^2$$

$$r=[r12+r23\exp(-2i\Phi)]/[1+r12r23\exp((-2i\Phi))]$$

$$T=(n3/n1)(|t|^2); \text{ and}$$

$$t=[t12t23\exp((-i\Phi))]/[1+r12r23\exp(-2i\Phi)],$$

where rij and tij are the Fresnel coefficients of reflection and transmission for light traveling from medium i to medium j, n1, n2, n3 are the complex refractive indices nj=nj−ikj of air, the film and the substrate respectively, $\Phi=(2\pi/\lambda)$ n2 d and $\lambda$ is the wavelength. R is the reflectance, T the transmittance, r and t are the amplitudes of the Fresnel reflection and transmission for the film and d is the film thickness. Based on knowledge of rij , tij, n1, n2, n3, $\Phi$, R, T, r, and t, then, d may be found through basic algebraic principles.

An embodiment may be practiced with regard to any particular organic electronic device 10 with an electron injection layer 14. Moreover, an embodiment may be practiced with regard to any other device having a thin layer of a metallic nature sandwiched between transparent layers and a reflective layer. Accordingly, an embodiment is to be interpreted to encompass any such device.

With an embodiment, the thickness of an electron injection layer 14 in an organic Led 10 may be measured without destroying such organic electronic device 10, and in a relatively fast and efficient manner. In particular, since the measurement is obtained from the viewing side 20 of the organic electronic device 10, such measurement can be performed on ready-to-ship parts as a cost effective tool for checking quality and if necessary taking appropriate corrective action. Such measurement may also be performed on transparent films as well, such as for example buffer materials, light emitting polymers, electron transport layers, evaporated organic molecules, mono-layer thin films, multilayer thin metal and other EI films, of course with appropriate modification.

The programming necessary to effectuate the processes performed in connection with an embodiment is relatively straight-forward and should be apparent to the relevant programming public. Accordingly, such programming is not attached hereto. Any particular programming, then, may be employed to effectuate an embodiment without departing from the spirit and scope thereof.

In the foregoing description, it can be seen that an embodiment comprises a new and useful method and mechanism by which the thickness of a thin metal layer such as the aforementioned electron injection layer 14 can be measured in a non-destructive manner in a device such as the aforementioned organic electronic device 10. The method and mechanism are optical in nature so that the method can be performed on an encapsulated test coupon as well as on a completely fabricated display including the organic electronic device 10, and is based on a measured reflectance profile of the organic electronic device 10.

It should be appreciated that changes could be made to the embodiments described above without departing from the inventive concepts thereof. It should be understood, therefore, that this invention is not limited to the particular embodiments disclosed, but it is intended to cover modifications within the spirit and scope of an embodiment as defined by the appended claims. For example, an embodiment may be used in connection with a top-emitting organic display with a reflective anode and a transparent cathode structure.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Many aspects and embodiments have been described above and are merely exemplary and not limiting. After reading this specification, skilled artisans appreciate that other aspects and embodiments are possible without departing from the scope of the invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

The invention claimed is:

1. A method for measuring a thickness of an internal layer of a device having a plurality of layers, the method comprising:
   generating a set of baseline reflectance profiles from a corresponding set of baseline devices, each baseline device having a known thickness of an internal layer thereof;
   generating a reflectance profile from the device; and
   comparing the generated reflectance profile from the device to the generated set of baseline reflectance profiles from the corresponding set of baseline devices to determine the thickness of the internal layer of the device.

2. The method of claim 1, wherein generating the reflectance profile comprises generating a reflectance profile comparing reflectance at a viewing side of the device or baseline device against a defined spectrum range.

3. The method of claim 2, further comprising generating the reflectance profile at a spectrum range of 190-1000 nm.

4. The method of claim 1, further comprising generating the set of baseline reflectance profiles from the corresponding set of baseline devices such that the reflectance profiles vary based on the thicknesses of the layers of the baseline devices, whereby reflectance decreases as the thickness of the layer increases.

5. The method of claim 1, wherein comparing the reflectance profiles comprises matching the reflectance profile of the device to the reflectance profiles of the baseline devices to find close matching reflectance profiles of the baseline devices, and using the corresponding thicknesses of such close matching reflectance profiles to determine the thickness of the internal layer for the device.

6. The method of claim 1, wherein comparing the reflectance profiles comprises employing data analysis software.

7. The method of claim 6, further comprising employing the data analysis software to measure the thickness of the respective internal layers of a plurality of the devices in a non-destructive manner and in a near real-time manner in a mass-production setting.

8. The method of claim 1, wherein generating the set of baseline reflectance profiles from the corresponding set of baseline devices comprises:
selecting a plurality of baseline devices;
for each selected baseline device:
generating a reflectance profile for the baseline device; and
determining a thickness of the internal layer of the baseline device; and
compiling the generated reflectance profiles and corresponding determined thicknesses into a predetermined format.

9. The method of claim 1, wherein determining the thickness of the internal layer of each baseline device comprises transversely slicing the baseline device through the plurality of layers thereof and measuring such thickness.

10. A method for measuring a thickness of an internal layer of device having a plurality of layers, the method comprising:
generating a set of baseline transmission profiles from a corresponding set of baseline devices, each baseline device having a known thickness of the internal layer thereof;
generating a transmission profile from the device; and
comparing the generated transmission profile from the device to the generated set of baseline transmission profiles from the corresponding set of baseline devices to determine the thickness of the internal layer of the device.

11. The method of claim 10, wherein generating each transmission profile comprises generating a transmission profile comparing transmission from a viewing side to an opposite side of the device against a defined spectrum range.

12. The method of claim 11, further comprising generating the transmission profile at a spectrum range of 190-1000 nm.

13. The method of claim 10, further comprising generating a set of baseline transmission profiles from a corresponding set of baseline devices such that the transmission profiles vary primarily based on the thicknesses of the internal layers of the baseline devices, whereby transmission decreases as the thickness of the internal layer increases.

14. The method of claim 10, wherein comparing the transmission profiles comprises matching the transmission profile of the device to the transmission profiles of the baseline devices to find matching transmission profiles of the baseline devices, and using the corresponding thicknesses of such close matching transmission profiles to determine the thickness of the internal layer for the device.

15. The method of claim 10, wherein comparing the transmission profiles comprises employing data analysis software.

16. The method of claim 15, further comprising employing the data analysis software to measure the thickness of the respective internal layers of a plurality of the devices in a non-destructive manner and in a near real-time manner in a mass-production setting.

17. The method of claim 10, wherein determining the thickness of the internal layer of each baseline device comprises transversely slicing the baseline device through the plurality of layers thereof and measuring such thickness.

18. The method of claim 1, wherein the internal layer of the device includes an electron injection layer.

19. The method of claim 10, wherein the internal layer of the device includes an electron injection layer.

* * * * *

UNITED STATES PATENT AND TRADEMARK OFFICE
CERTIFICATE OF CORRECTION

| | | |
|---|---|---|
| PATENT NO. | : 7,586,622 B1 | Page 1 of 1 |
| APPLICATION NO. | : 11/303905 | |
| DATED | : September 8, 2009 | |
| INVENTOR(S) | : Ramakrishnan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Twenty-first Day of September, 2010

David J. Kappos
*Director of the United States Patent and Trademark Office*